Figure 1:
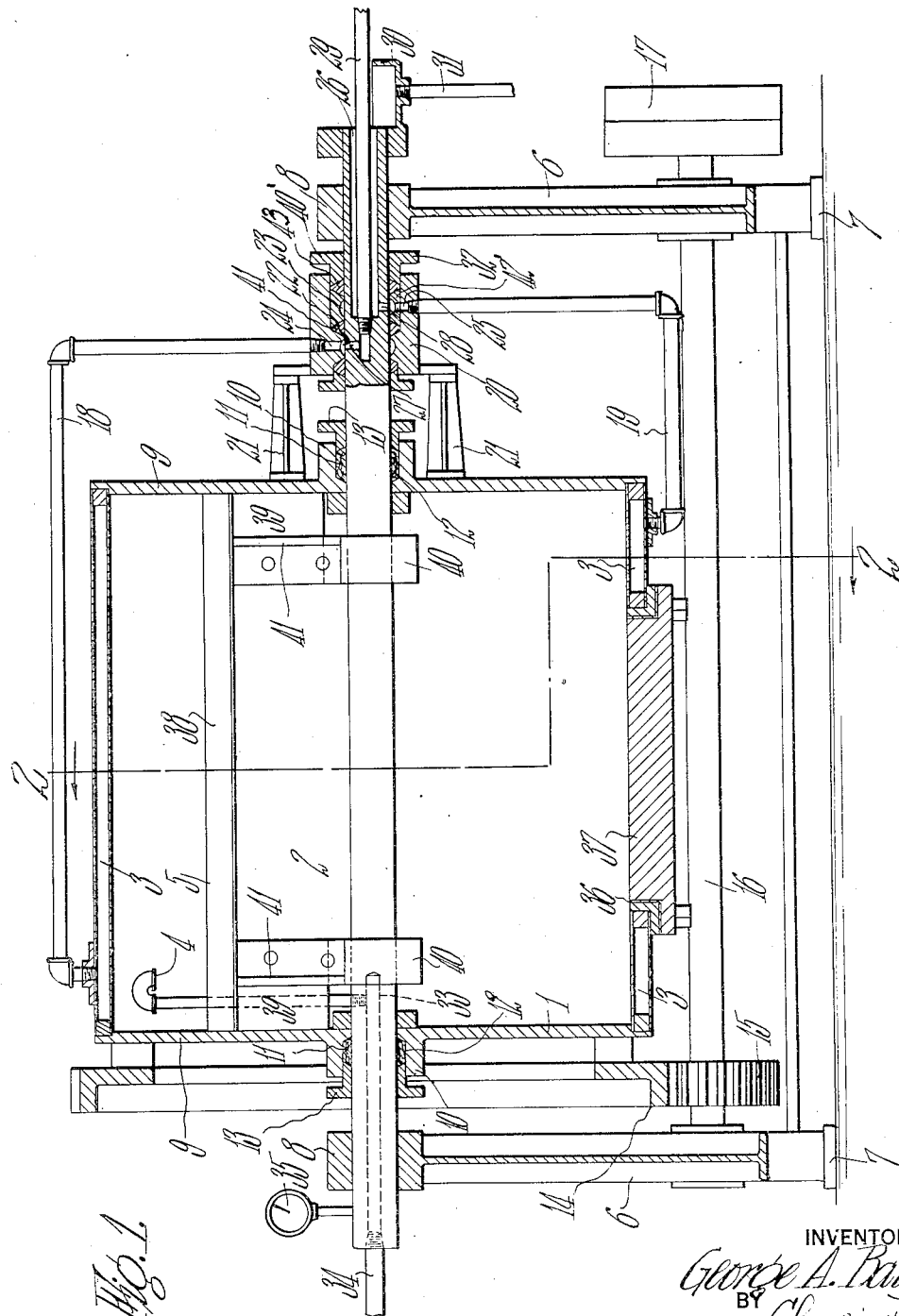

G. A. BAUSMAN.
REFINING APPARATUS.
APPLICATION FILED JUNE 2, 1919.

1,381,269.

Patented June 14, 1921.
2 SHEETS—SHEET 1.

INVENTOR
George A. Bausman.
BY Chapin + Neal
ATTORNEYS.

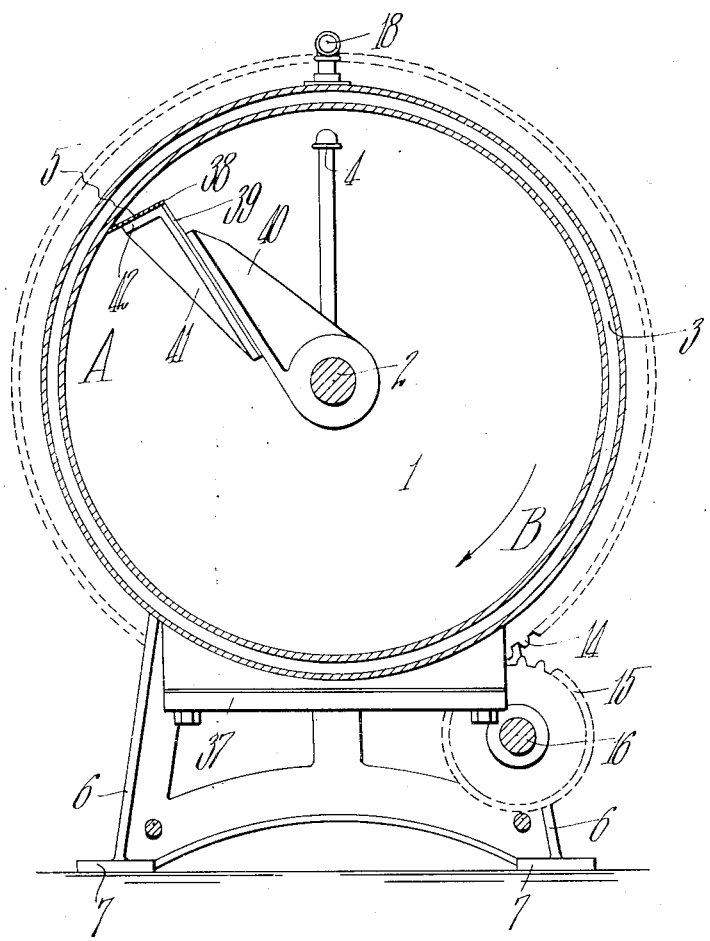

UNITED STATES PATENT OFFICE.

GEORGE A. BAUSMAN, OF SPRINGFIELD, MASSACHUSETTS, ASSIGNOR TO NATIONAL EQUIPMENT COMPANY, OF SPRINGFIELD, MASSACHUSETTS, A CORPORATION OF MASSACHUSETTS.

REFINING APPARATUS.

1,381,269.      Specification of Letters Patent.      Patented June 14, 1921.

Original application filed January 20, 1919, Serial No. 272,096. Divided and this application filed June 2, 1919. Serial No. 301,215.

*To all whom it may concern:*

Be it known that I, GEORGE A. BAUSMAN, a citizen of the United States of America, residing at Springfield, in the county of Hampden and State of Massachusetts, have invented certain new and useful Improvements in Refining Apparatus, of which the following is a specification.

This invention relates to improvements in refining apparatus. While the invention is capable of general application, it finds one advantageous use in the refining or maturing of chocolate and the like and is particularly adapted for carrying out a process disclosed in my copending application Serial No. 272,096, filed January 20, 1919.

Such process is characterized in that the material to be refined, such as chocolate liquor for example, is subjected to a systematic tumbling action, so that portions of the mass flow back over other portions to produce a repeated rubbing of the particles of the mass one upon another and a consequent rounding of such particles to improve the smoothness of the mass. The improvement of the quality of smoothness has been attempted, heretofore, in various refining machines. The ideal smoothness has been secured only with difficulty by prior machines and the use of power and time way beyond that necessary with the present invention. The fault of the prior machines has been, I believe, that rolling with rolls and haphazard churning action, upon which they depended, was decidedly inefficient. Certainly, the time required to smooth all the particles has been so great that it has been a serious drawback to have to work the batch for such a length of time.

With these difficulties in mind, I have invented an apparatus for refining chocolate, and like substances, which is not dependent on the use of rolls or the haphazard churning around of the mass to be refined. Instead, the apparatus is characterized in that it produces a systematic and controlled tumbling, or rolling, of one particle against another and produces in a much shorter time, as compared to prior practice, a superior product of improved smoothness.

The term "tumbling" is used to describe, as near as may be, the turning of a portion of the liquor over on itself to flow over itself, as distinguished from haphazard churning movement. The action itself, in this art, being hitherto unrecognized and unpractised, it is of course without a recognized word to describe it.

As another feature of the invention, the apparatus, preferably, is provided with means to subject the mass, being treated, to at least a partial vacuum in a heated container during the tumbling action. In this way, moisture, to any desired degree, may be rapidly removed from the mass, such as chocolate liquor, while keeping the temperature of the mass well below that at which it would be caramelized. Thus, the time required for treatment may be reduced to a very great extent, as compared with prior processes in which evaporation at merely atmospheric pressure occurred in a wholly haphazard manner.

Other features and advantages will appear in the following description and in the illustrative embodiment of the invention in the accompanying drawings, in which—

Figure 1 is a longitudinal diametrical sectional view of an apparatus embodying the invention; and Fig. 2 is a cross sectional view thereof, taken substantially on the line 2—2 of Fig. 1.

Referring to these drawings; the apparatus includes essentially a containing drum 1, supported for rotation by a shaft 2, and a stationary scraper 5, arranged to contact with the inner peripheral surface of the drum, preferably at a point somewhat above the highest point assumed by the mass, when such mass is being rolled. Preferably also, the drum is double walled to provide a jacket 3 in which a suitable heating medium, such as steam or water, may circulate to heat the mass during the tumbling action. A vacuum connection 4 is also desirably provided for the interior of the drum, for the reasons hereinbefore stated.

As to the details of the exemplary apparatus illustrated: Conveniently uprights 6, 6 rise from the bases 7, 7 of the machine to stationarily receive the ends of the shaft 2 in their joined upper ends 8, 8. The end plates 9, 9 of the drum, fixedly connected with the cylindrical side wall thereof, are rotatably mounted upon the shaft 2 by the bearings 10, 10, provided with suitable stuffing boxes 11, 11, packing 12, 12 and glands 13, 13.

The drum is driven by the gear 14, fixed to the drum and receiving motion from the gear 15, which in turn is fixed to the driving shaft 16, rotatably mounted on the machine frame, and driven by the pulley 17.

A mixture of hot water and steam is introduced to the jacket 3, through the pipe 18, and flows, preferably with the steam condensed from the jacket, through the pipe 19. These pipes are conveniently associated with the drum as follows: The connector 20 is carried on the shaft 2, to rotate with the drum, being connected thereto by the brackets 21, 21. The connector has a pair of circumferential grooves 22 and 23, the groove 23 being connected to the pipe 19 by the passage 25. The shaft 2 has a passage 26 therein, which communicates at its reduced inner end with a passage 27 leading to the groove 22, and which passage 26, at its larger portion, communicates with the groove 23 by a passage 28. A pipe 29 of less diameter than the major portion of the passage 26, is screwed into the reduced end of the passage. At the outer end of the passage 26, the shaft carries a drip cup 30 and drain pipe 31. The connector 20 is provided with suitable stuffing box constructions 32 and 43. With this arrangement it will be seen that steam introduced to the pipe 29 will flow through the passage 27, the groove 22, the passage 24, the pipe 18, the jacket 3, the pipe 19, the passage 25, the groove 23, the passage 28, the passage 26, the drip cup 30 and the pipe 31, thus providing a proper circuit for the steam.

The air exhaust pipe 4 is connected with a passage 33 in the shaft, which passage is in communication with any suitable exhaust apparatus (not shown) by the pipe 34, a vacuum gage 35 being conveniently connected with the passage 33, if desired.

Access to the drum is obtained by an aperture 36, which is closed by cover 37, removably secured thereto by any suitable means.

The scraper, designated generally as 5, comprises, preferably and as illustrated, a rectangular plate 38, extending substantially from end to end of the drum and sufficiently flexible to closely follow, and at all times contact, the wall of the drum, and end-wall scraper blades 39, 39, desirably rectangular in shape, and each scraping the adjacent end wall with its longitudinal edge in contact therewith. As illustrated, the blades are carried by radially extending brackets 40, 40, stationarily carried by the shaft 2, braces 41, 41 being bolted to the brackets, blades 38 being attached to the top arms 42, 42, of the braces, and the blades 39, 39 being clamped each between a bracket and brace.

Conveniently, the stuffing box construction 32 includes the gland 40′, packings 43 and spacer-gland 42′ and, since the spacer 42′ of course rotates with the body of the connector, the groove 23, as a matter of detail and convenience, is provided therein.

The operation of the apparatus may be best understood by a consideration of its use in practising the aforesaid process. The apparatus may obviously be used for other purposes and the one now to be described is given merely by way of illustrative example.

In practising such process:—the chocolate liquor which already, if desired, has been brought to that point where the usual refiners would ordinarily be used, and consists, of course, of chocolate particles together with liquid cocoa butter, is placed in the drum, and the drum rotated at such speed as desired, to carry the viscous mass upward in the direction of rotation, say, roughly to the point A (Fig. 2), wherefore the liquor, somewhere near the point A, rolls over on itself and tumbles down along the inclined face of the liquor, say, to about the point B, continuously. In this action, I conceive, the particles roll, the one on the other, and not only does this action occur, but also the particles are rolled and tumbled about in the cocoa butter content of the liquor which action also most valuably aids in the rounding and smoothing of the particles. Nothing of a character to scar, sharpen, or crush the particles takes place, and all the particles are rounded and smoothed as desired. The rotation of the drum is continued until test shows that all particles have been rounded and no sensation of roughness occurs when the chocolate is tasted.

During the performance of the above action the scraper acts to remove any chocolate, which might otherwise tend to stick to the side and end walls of the drum and thereby insulate the rest of the material from the side of the drum and be itself unduly heated. More than that, the scraper acts to inaugurate the tumbling of such liquor, as might be carried that far upon the drum.

While the tumbling action is being performed, the liquor is heated by the steam or hot water in the jacket, and vacuum is preferably established in the drum at the same time. This gives a forced evaporation of moisture in the chocolate mass so that the temperature can be kept well below the point where the mass would be caramelized—but yet rapid evaporation effected. In addition, the vacuum causes the occluded air or gases in the chocolate mass to break out and escape whereby the mass is rendered more dense, and therefore more desirable, than would otherwise be the case if partial vacuum conditions in the drum did not prevail during the refining of the chocolate.

The invention has been disclosed herein, in an embodiment at present preferred, for illustrative purposes, but the scope of the invention is defined by the appended claims rather than by the foregoing description.

What I claim is—

1. An apparatus for refining chocolate and the like, comprising, a tumbling barrel, means to heat the barrel, means to maintain a partial vacuum within the barrel during action on the mass under treatment, and means located within said barrel and stationarily mounted relative thereto for engaging the interior surface of the barrel and preventing continued adhesion of the mass thereto.

2. An apparatus of the character indicated, comprising a stationary axial support, a container rotatably mounted upon said support and inclosing the same, a scraper for the interior surface of said container stationarily mounted upon said support in position to contact said surface, means for rotating said container, and means for maintaining a partial vacuum in said container.

3. An apparatus for refining chocolate or the like comprising a stationary axial support, a substantially cylindrical container rotatably mounted upon said support and provided with a jacket portion, means for circulating a heating fluid within the jacket during rotation of said container, and means carried by said support within the container for engaging the interior walls of said container to effect substantially complete removal of the mass of material being treated from the walls of the container during a revolution of the container.

4. An apparatus for refining chocolate or the like comprising a stationary axial support, a cylindrical container axially mounted for rotation upon said support and provided with a jacket portion, means for circulating a heating fluid within the jacket during rotation of the container, means for creating a partial vacuum in said container, and means within the container carried by the axial support for engaging the interior walls of said container to effect substantially complete removal of the mass of material being treated from the walls of the container during a revolution of said container.

5. An apparatus for refining chocolate or the like, comprising a stationary axial support, a cylindrical container axially mounted for rotation upon said support, and means within the container carried by the axial support and so arranged as to engage the interior walls of the container somewhat above the point to which the mass of material is ordinarily carried by the rotation of the container whereby substantially complete removal of the mass of material being treated from the walls of the container is effected during a revolution of said container.

GEORGE A. BAUSMAN.